United States Patent
Lopushansky et al.

(10) Patent No.: US 7,134,346 B2
(45) Date of Patent: Nov. 14, 2006

(54) DIFFERENTIAL PRESSURE TRANSDUCER WITH FABRY-PEROT FIBER OPTIC DISPLACEMENT SENSOR

(75) Inventors: Richard L. Lopushansky, The Woodlands, TX (US); John W. Berthold, Salem, OH (US)

(73) Assignee: Davidson Instruments Inc., The Woodlands, TX (US)

( * ) Notice: Subject to any disclaimer, the term of this patent is extended or adjusted under 35 U.S.C. 154(b) by 44 days.

(21) Appl. No.: 11/105,670

(22) Filed: Apr. 14, 2005

(65) Prior Publication Data

US 2005/0241399 A1 Nov. 3, 2005

Related U.S. Application Data

(60) Provisional application No. 60/562,454, filed on Apr. 15, 2004.

(51) Int. Cl.
*G02B 6/00* (2006.01)
(52) U.S. Cl. .............................. 73/716; 73/736; 385/13
(58) Field of Classification Search ............... 73/716, 73/736, 722; 386/13
See application file for complete search history.

(56) References Cited

U.S. PATENT DOCUMENTS

| | | | |
|---|---|---|---|
| 4,210,029 A | 7/1980 | Porter | |
| 4,777,358 A | 10/1988 | Nelson | |
| 4,787,741 A | 11/1988 | Udd et al. | |
| 4,806,016 A | 2/1989 | Corpron et al. | |
| 5,202,939 A | 4/1993 | Belleville et al. | |
| 5,218,418 A | 6/1993 | Layton | |
| 5,361,130 A | 11/1994 | Kersey et al. | |
| 5,386,729 A | 2/1995 | Reed et al. | |
| 5,392,117 A | 2/1995 | Belleville et al. | |
| 5,647,030 A | 7/1997 | Jorgenson et al. | |
| 5,835,645 A | 11/1998 | Jorgenson et al. | |
| 5,986,749 A | 11/1999 | Wu et al. | |
| 6,069,686 A | 5/2000 | Wang et al. | |
| 6,122,415 A | 9/2000 | Blake | |
| 6,304,686 B1 * | 10/2001 | Yamate et al. | 385/13 |
| 6,425,290 B1 | 7/2002 | Willcox et al. | |
| 6,492,800 B1 | 12/2002 | Woods et al. | |
| 6,496,265 B1 | 12/2002 | Duncan et al. | |
| 6,552,799 B1 | 4/2003 | Wright et al. | |
| 6,612,174 B1 | 9/2003 | Sittler et al. | |
| 6,621,258 B1 | 9/2003 | Davidson et al. | |
| 6,636,321 B1 | 10/2003 | Bohnert | |
| 2003/0039428 A1 | 2/2003 | Okamoto et al. | |
| 2004/0075841 A1 | 4/2004 | Van Neste et al. | |

\* cited by examiner

*Primary Examiner*—Edward Lefkowitz
*Assistant Examiner*—Andre Allen
(74) *Attorney, Agent, or Firm*—Robert H. Earp, III; McDonald Hopkins Co., LPA

(57) ABSTRACT

A differential pressure transducer which incorporates a Fabry-Perot sensor for direct quantitative measurements of the distance displaced by a piston abutting two pressure boundaries is described. The apparatus includes a piston with an annular protrusion which is fitted into a transducer housing having a peripheral groove that serves as a stop to prevent damage to the in overpressure situations. A method of measuring differential pressure using a Fabry-Perot sensor is also contemplated.

10 Claims, 6 Drawing Sheets

DIFFERENTIAL PRESSURE TRANSDUCER WITH FABRY-PEROT FIBER OPTIC DISPLACEMENT SENSOR

This application claims the benefit of U.S. Ser. No. 60/562,454, filed on Apr. 15, 2004.

FIELD AND BACKGROUND OF INVENTION

The present invention relates in general to differential pressure transducers and in particular to a new and useful differential pressure transducer that relies upon a Fabry-Perot fiber optic sensor to measure displacements and calculate differential pressure on the basis of such measurements.

Differential pressure (dP) transducers now known in the art usually contain a displacement sensor coupled between two thin diaphragms. It is well known in the art that the coupling between the two diaphragms can be accomplished with a mechanical linkage or through hydraulic coupling or both together. The two coupled diaphragms perform a mechanical subtraction of the pressures on them and the sensor measures their net motion relative to the transducer body to determine differential pressure. It has been the practice to fill the volume between the diaphragms with a hydraulic fluid in order to prevent rupture of the thin diaphragms due to the high static pressures while maintaining sensitivity to differential pressure. When the static pressure in the process line is presented to one side of each diaphragm, the fill fluid is pressurized to the line pressure. Deflection stops are incorporated to prevent rupture of the diaphragms in the event only one side of the transducer is subjected to high static pressure.

If the boundary of the volume between the diaphragms, including the diaphragms, electrical feedthroughs and fill/bleed ports, is not totally sealed small leaks of fill fluid will occur and will cause unacceptable increases in response time, sensor output drift and transducer non-linearity with pressure. In some cases, these changes may not be readily detected when the transducer is in service because the transducer output may remain stable at constant dP. The leaking of fill fluid from these known dP transducers is a problem that is well known and documented.

FIG. 1 depicts a first configuration for the known differential pressure transducer described above. Differential pressure cell 110 includes two spaced diaphragms 122 connected to a housing by seals 114. The diaphragms 122 are mechanically coupled to one another by way of the sensor. Fill fluid 116 and a sensor 120 are contained between the diaphragms 122 as well as a sensor lead wire 112. Diaphragm stops 124 are employed outside of the diaphragms 122. The pressure across the diaphragms 122 is measured as described herein.

FIG. 2 illustrates a second configuration. Here, the fluid-filled differential pressure transducer has a welded assembly 210 including isolation diaphragms 231, sensing diaphragm 233, fill fluid 216, and lead wires, which are also the high- and low-pressure fill tubes 225. In this configuration, the mechanical linkage between the two pressure isolation diaphragms is a third diaphragm called a sensing diaphragm. The measured change in capacitance between the sensing diaphragm 233 and high and low pressure metallized surfaces 237 is directly proportional to the pressure difference across the transducer 210. The cell further comprises process chambers 229 spaced away from convoluted pressure plates 235. Electrical insulator 221 is also provided as well as ceramic inserts 228.

The fill tube penetrations 225 in FIG. 2 are the locations most likely to leak fill fluid over time. In process plant pipeline application for example, the pressure on the fill fluid 216 is nominally 3000 psi at operating pressure. If the fill tube diameters 225 are kept small, the force acting on the fluid 216 to push it out of the fill tube penetrations 225 will also be small. Nevertheless, a good seal is difficult to maintain. Fill fluid leaks are also possible between the outside diameter of the fill tube 225 and the glass insulating material 221, and along the boundaries between the insulating material 221 and metal housing 211. Thus, it is very difficult to make a totally leak-tight seal, since penetrations through the high pressure boundary must be made. Similar leakage problems can occur with respect to the design of FIG. 1.

Another inadequacy of fluid-filled dP transducers is the static pressure effect. A dP transducer as described should output a value of zero when the same process pressure is applied to both diaphragms. However, the static pressure causes the fill fluid to be pressurized resulting in distortions of the transducer body. These distortions cause relative motions between the diaphragms and body resulting in static pressure effect on zero, and also produce radial forces on the diaphragms, which change their effective stiffness and cause static pressure effects on span. In addition, the displacement sensor is exposed to the fill-fluid pressure environment adding to the static pressure effects on both zero and span. In applications involving static pressures of about one thousand psig or greater, the requirement for a stable zero and span over the allowable range of static pressure is difficult to achieve in practice.

Yet another inadequacy of fluid-filled dP transducers is the effect of hydrogen. When dP transducers are operated in a hydrogen-rich environment, for example, in a hydrocarbon processing facility, the hydrogen gas easily diffuses through thin diaphragms and into the fill fluid. If the dP transducer is used to measure pressure differences such as may exist in a high pressure pipeline, then the fill fluid will experience the large static pipeline pressure. If hydrogen has diffused into the fill fluid, then when the pipeline pressure is reduced such as during a scheduled shutdown, the hydrogen gas boils out of the fill fluid and forms a bubble. Since the enclosed volume of fill fluid is constant, a bubble of hydrogen within the closed volume deforms the diaphragms, which results in a calibration shift, zero offset or in the worst case, diaphragm rupture. Such failures are normally undetected until the system is brought back on line resulting in safety issues and delays in production.

The use of a fill fluid also contributes to degraded performance of a dP transducer when it is operated over a range of temperatures, as is normal in service. The volumetric expansion of liquids with temperature is significantly greater than that of the metals used in construction of the transducer body. Thus, when the temperature of the transducer changes, the volume of the fill fluid changes more than the volume of the body. This results in motion of both the thin diaphragms away from their rest positions, distorting their shape and causing degraded linearity and accuracy. The normal method for limiting this effect is to keep the volume of the fill fluid at an absolute minimum; this method aggravates the effect of leakage because a leak of a given volume is a more significant part of the total fluid volume.

Rather than perform a mechanical subtraction of two large pressures as described above, an alternative approach would be to measure each pressure with a separate gage pressure transducers that do not require fill fluids. The differential pressure can be determined by subtracting the signals electronically. If the full-scale differential pressure range to be measured is 400 in H2O(15 psi) and the desired accuracy is 0.1% of Full Scale Range (0.015 psi), then for application at 3000 psig line pressure, a gage pressure transducer is required which has an accuracy of 0.015/3000=0.0005% (1:200,000). Such devices are not commercially available, and not yet achieved with any known technology. Thus, mechanical subtraction of two large pressures is the only alternative measurement approach available with present day technology.

U.S. Pat. No. 5,386,729 discloses a differential pressure transducer that does not require any fill fluid and uses a microbend fiber optic sensor which must be mounted to both the beam and the transducer housing. A microbend fiber optic sensor produces changes in light intensity that are detected by a detector to sense movement of a beam, e.g. a mechanical linkage, positioned between two pressure sensitive diaphragms. Backing stops are provided to prevent unwanted rupture of the diaphragms. Because the sensor relies upon intensity measurements which are themselves affected by movement of the beam or the transducer housing, the sensor can be affected by vibrations in either of the items to which it is mounted.

While this approach eliminates the need for fill-fluid, the reliance on intensity measurement by the fiber optic sensor leads to potential errors in light attenuation measurement by causes other than beam motion, e.g. drift in light source output, changes in losses in the optical fiber, couplers and connectors may all change the light intensity as well. Additionally, the beam and diaphragm must provide enough force to move the microbend sensor plates which are attached to the beam. This requires that the beam and diaphragms be relatively massive, which in turn means the overall assembly must be large and massive. Consequently, a dP cell with microbend sensors is subject to vibration sensitivity, as mentioned above, as well as thermal sensitivity and the costs associated with manufacturing such a dense and massive item. All of the shortcomings with microbend sensors are alleviated with an optical non-contact displacement sensor such as the Fabry-Perot fiber optic sensor which does not have to be positioned on the beam to measure the absolute position of the beam and is not sensitive to light intensity changes.

U.S. Pat. No. 6,425,290 and related U.S. Pat. No. 6,612,174 also contemplate differential pressure transducers that require the use of a capacitive sensors or diffraction gratings and interference patterns. Moreover, these differential pressure transducers do not contemplate the use of interferometric fiber optic Fabry-Perot sensors, nor do these sensors suggest a means of integrating a structural support and stopping mechanism directly into the sensor design.

Differential pressure transducers find utility in the measure of flow and level in applications where fluids are present and/or being transported, in addition to a myriad of other uses known to those skilled in the art. On occasion, such pressure transducers may be used in conjunction with orifice plates and venturi tubes for flow measurement in pipes. For the sake of simplicity, as used throughout this application and the appended claims, it should be understood the inventors use the terms orifice plates and venturi tubes interchangeably based upon their sumilar functionality.

Basically, the orifice plate is a round plate with a hole in the center. The plate serves as an obstruction to the flow. Capillary lines (i.e. tube) or impulse lines are connected to pressure taps in the pipe or on the flange at the location of the orifice plate. These lines are then connected to the differential pressure transducer and used to measure the pressure on each side of the orifice plate. Since the inner diameter of the pipe is much larger than the hole in the orifice plate, gas or liquid flowing in the pipe is forced through the smaller diameter orifice and the pressure on the upstream side is always greater than the pressure on the downstream side. The measured pressure difference across the orifice is proportional to the square of the mass flow rate and is normally measured in inches of water of differential pressure.

Presently, there is no known system or method for providing a differential pressure transducer which avoids the aforementioned problems by incorporating a Fabry-Perot interferometric fiber optic sensor. A differential pressure transducer which is relatively lightweight, easy to manufacture, immune to leakage of fill fluid, tolerant to very high temperatures, insensitive to thermal variations or vibrations, and immune to hydrogen migration would be welcomed by industry. A transducer that can be directly integrated with an orifice plate or venturi tube would also be welcomed.

SUMMARY OF INVENTION

The present invention pertains to a differential pressure transducer. The transducer includes two diaphragms. A rigid piston is placed between the diaphragms and enclosed by a transducer housing having an interior peripheral groove. An annular protrusion on the piston fits into the groove but is sized to permit movement of the piston relative to the housing. The groove and protrusion also serve as an overpressure stop device to prevent unwanted damage to the transducer. Optimally, the transducer housing comprises a pair of support rings, wherein at least one of the rings has a variable diameter which defines the aforementioned groove. A Fabry-Perot sensor is affixed to the housing and is used to quantitatively measure the distance by which the piston is displaced, possibly proximate to the peripheral groove or provided through an aperture in the piston itself.

A method for measuring differential pressure between two diaphragms comprising providing a piston with an annular protrusion and enclosing the piston with a transducer housing so that the protrusion fits within a peripheral groove within the housing, monitoring a Fabry-Perot sensor to quantitatively measure movement of the piston relative to the housing and calculating the differential pressure from the quantitative movement. In both the method and apparatus, the measured distance represents the differential pressure exerted upon the diaphragms and appropriate calculations can be used to determine that pressure.

BRIEF DESCRIPTION OF DRAWINGS

FIGS. 3a and 3c are cross sectional views of a differential pressure transducer according to the present invention, while

DETAILED DESCRIPTION OF PREFERRED EMBODIMENTS

Figure 1:
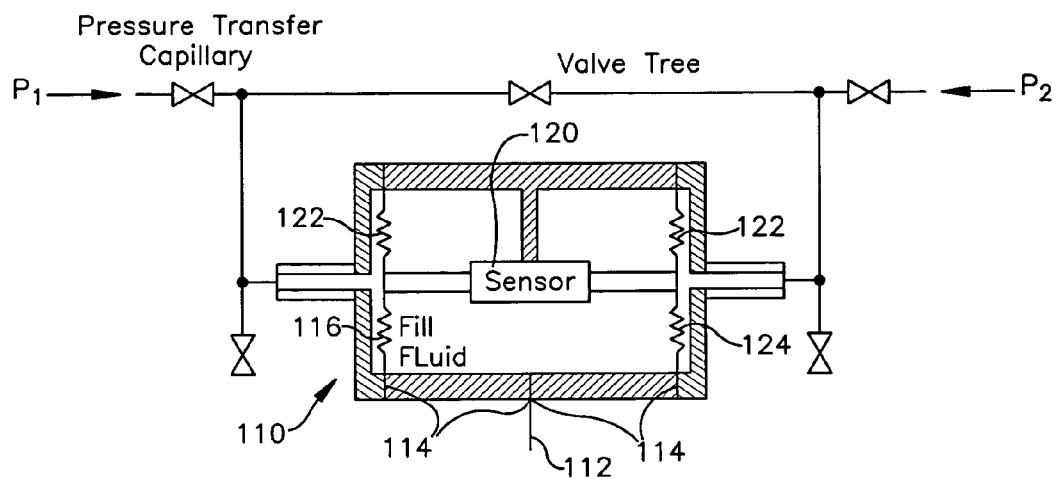
FIG. 1 is a schematic view illustrating a prior art differential pressure transducer requiring the use of a fill fluid.
Figure 2:
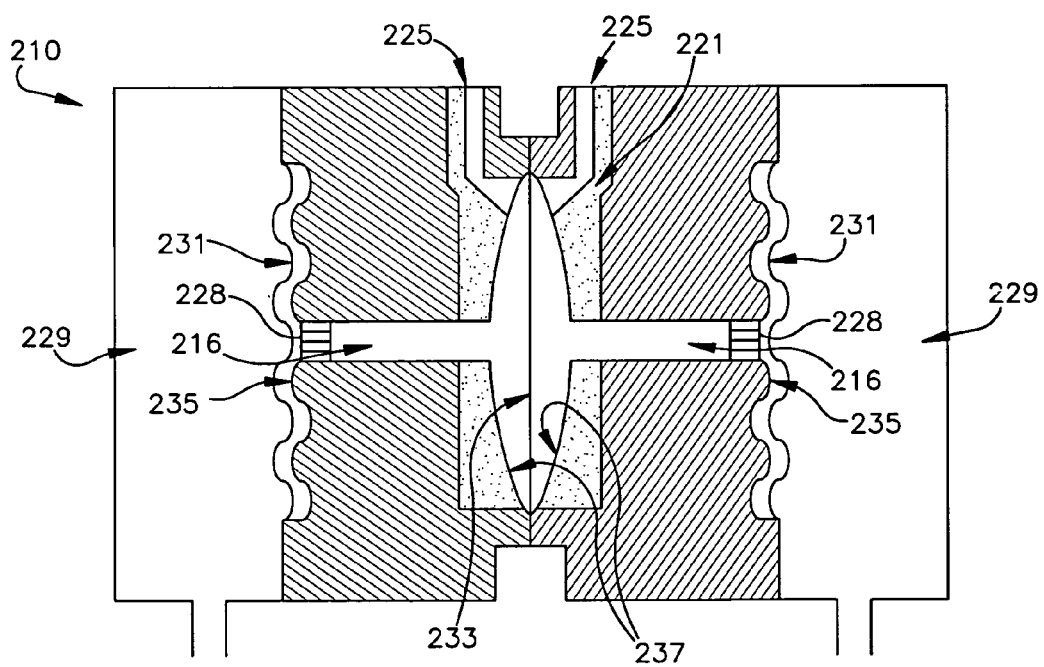
FIG. 2 is a schematic view of a prior art differential pressure transducer requiring the use of a capacitance sensor in combination with a fill fluid.

The present invention provides an alternative to the differential pressure transducers known in the art, and is particularly well-suited replacement for those presented in FIGS. 1 and 2. Additionally, it improves upon previous transducers by providing a Fabry-Perot sensor which quantitatively and directly measures directly measures absolute displacements within the transducer in a non-contact manner and without the use of light intensity calibration curves, which themselves may be negatively influenced by unknown but unwanted problems with the transmission fiber and/or light source. Additionally, the invention represents a significant simplification of design in comparison to previously known transducers that require the positioning of fibers between corrugations or the use of specially designed gratings.

Figure 3A:
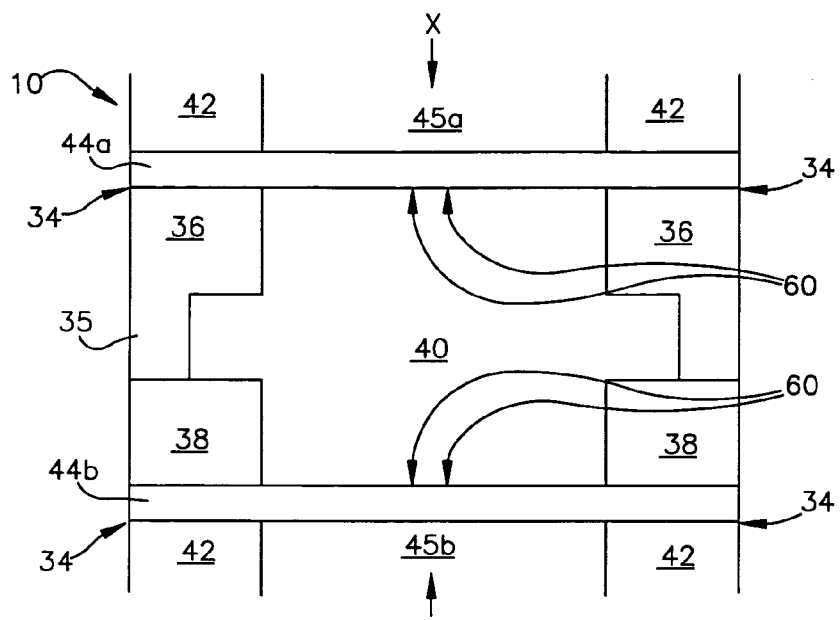

In the present invention presented in FIG. 3a, fill fluid is not used in the volume between the diaphragms. The internal pressure between the diaphragms is at atmospheric pressure rather than the static process pressure as in conventional fluid-filled differential pressure even when the process pressure is in excess of 3000 psi. To prevent the diaphragms from deforming or rupturing when they are exposed to high pressures such as 3000 psi, transducer 10 includes a rigid piston 40. The piston 40 has an annular protrusion on its outer diameter which fits into an annular groove along the inner diameter (or, in the event of a non-circular piston, inner periphery) of transducer housing 33 to form a stop 48, as described in greater detail below. Notably, the protrusion on piston 40 is sized so that it is smaller than the stop groove, thereby permitting a range of axial motion for the piston 40 parallel to the axis of the housing. The transducer housing 33 may comprise upper and lower support rings 36, 38 wherein the inner diameter of support ring 36 is stepped so that when fitted adjacent one another, a groove is formed. It may also be possible to provide the flanges 42 as continuous member with an annular groove machined or formed therein to serve as the transducer housing.

The piston 40 is connected between spaced circular diaphragms 44a, 44b at the center of each diaphragm 44a, 44b. The rigid piston 40 mechanically couples the diaphragms 44a, 44b by way of welds 60 to one another so as to permit them to react to static pressure forces, and the diaphragms 44a, 44b deflect elastically when exposed to differential pressure. The diaphragms 44a, 44b in combination with flanges 42 constitute pressure boundaries for areas 45a, 45b, while the volume between the diaphragms 44 is vented to the atmosphere and does not need to be pressurized. Flanges 42 are designed to act as mechanical couplers and pressure boundary seals for the fluid input pressure to be measured. In the event support rings 36, 38 are used, these rings need not be manufactured to withstand any internal pressure and instead must only enclose the piston 40 while mechanically coupling the flanges 42 and diaphragms 44a, 44b.

The diaphragms 44a, 44b are sized to operate elastically but with sufficient deflection for the measurement of differential pressure. Circumferential welds 34 attach and seal the flanges 42 to the diaphragms 44, and circumferential welds 34 attach and seal the diaphragms 44 to the support rings 36, 38. Differential pressure changes cause axial motion substantially parallel to line X—X by the piston 40. Notably, this motion occurs because rigid piston 40 connects the diaphragms 44a, 44b, which themselves are deflected by differential changes in pressure in 45a, 45b.

A diaphragm stop 48 is provided as a machined feature around the circumference of the transducer housing 33. If the housing comprises a two support ring structure as described above, stop 48 works in conjunction with the protrusion of piston 40 such that, in an overpressure condition, the annular protrusion of the piston 40 will bear against the upper diaphragm support ring 36 when the pressure is greater on the lower diaphragm, while bearing against the lower diaphragm support ring 38 when the pressure is greater on the upper diaphragm. In either situation, unwanted movement of the piston 40 beyond its designed operating range is achieved with this single stop. Notably, although a solitary peripheral groove-protrusion arrangement is the preferred means for providing this safety measure, although a multitude of other features, whether singly or in combination, that do not complete line the periphery of the piston could be used. By the same token, reference to round or cylindrical shapes is not intended to limit the scope of the invention or the claims appended here to, and other shapes may be possible.

When a small pressure difference exists across the diaphragms 44, both diaphragms 44 deflect toward the low pressure side. This deflection results in motion of the piston from its neutral position (dP=0). Measurement of the axial displacement of the piston provides a direct measure of differential pressure, dP, as shown in the plot in FIG. 4. The dimensional parameters of one embodiment of the present invention are illustrated in Table 1 shown below. Note that without a sensitive low noise sensor, such as a Fabry-Perot fiber optic sensor, to measure small displacements, measurement of such small axial motions of the piston would not be possible.

A design summary for differential pressure transducer is shown in Table 1. The values chosen for the design parameters in this table are nominal values for a dP range of 400 in H2O. Different values for the design parameters could be chosen for other embodiments to measure other dP ranges.

TABLE 1

| Material | Inconel Alloy 718 |
| --- | --- |
| Piston Diameter | 0.315 inch |
| Piston Stop Diameter | 0.395 inch |
| Piston Length | 0.25 inch |
| Diaphragm Diameter | 0.32 inch |
| Diaphragm Thickness | 0.004 inch |
| Maximum Diaphragm Stress at 500° F. | 100,000 psi |
| dP Range | 0 to 400 in $H_2O$ |
| dP Resolution | 0.04 in $H_2O$ |

Using the arrangement shown in FIG. 3a, it is not necessary to make any penetrations through the pressure boundary for lead wires or fill fluid tubes that are commonly found in the known devices. Because there is no fill fluid used in the transducer assembly in the present invention, potential leakage of the transducer and the consequent performance degradation are eliminated. This invention provides for the transducer cavity to be unpressurized, which eliminates problems with in-diffused hydrogen and which eliminates the contributions to the static pressure effect from the pressure distortion of the housing and the pressure effects on the sensor capsule itself. The thermal performance of the transducer is improved because the effect of the volumetric expansion of the fill fluid is eliminated; the thermal expansion of the piston 40 can be readily matched to that of the flanges 42.

Figure 3B:
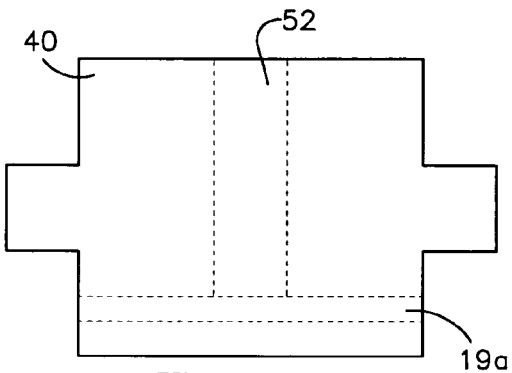
FIG. 3b shows a cross section of the piston used in the present invention.

As illustrated in FIG. 3b, hole 52 (indicated by broken lines) is formed in piston 40. A pin having a reflective surface is then fitted into hole 52. Additionally, channel 19a (also indicated by broken lines) is provided in piston 40. A Fabry-Perot fiber optic sensor subassembly is then provided in channel 19a, as described in greater detail below, so as to form a Fabry-Perot gap between the reflective surface of the pin and the sensor provided within channel 19a.

Figure 3C:
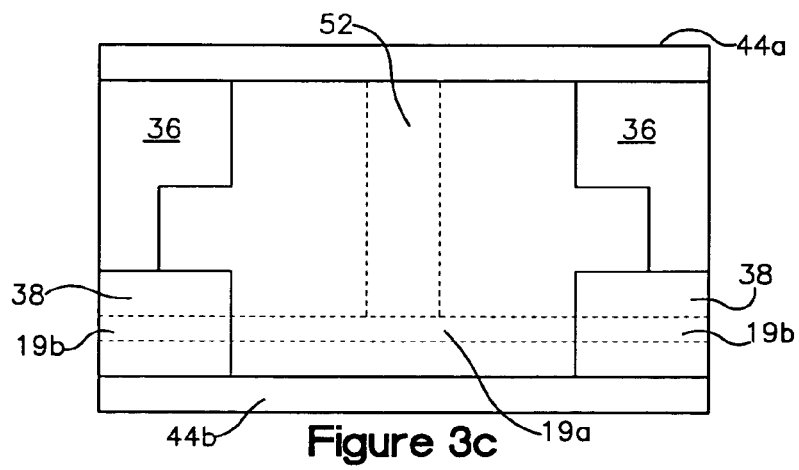

As seen in FIG. 3c, the sensor subassembly is anchored to the transducer housing 33, preferably in the lower support ring 38, by providing a channel 19b. Thus, when inserted, the sensor subassembly occupies a portion of the void created by channels 19a, 19b so that the subassembly does not move in response to the axial motion of piston 40. Thus, as with stop 48 described above, enough space must be left within the channels 19a, 19b so that the sensor subassembly may move therein.

Figure 5:
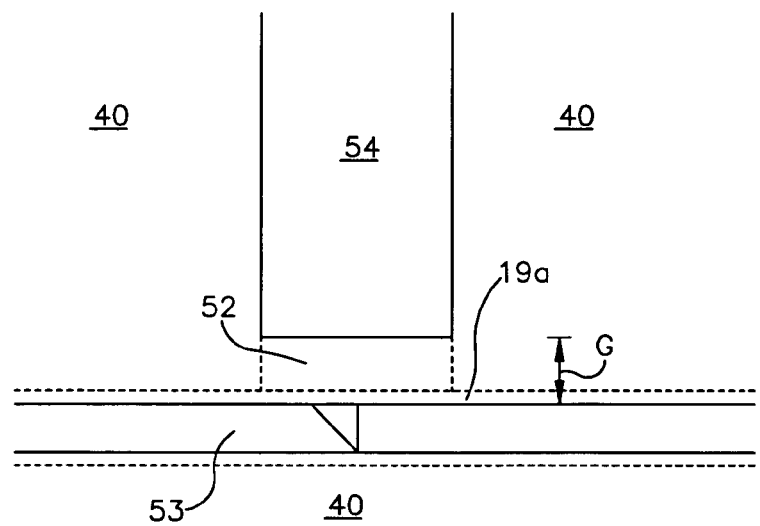
FIG. 5 is a cross sectional close up view of the interior portion of the piston used in the present invention.

FIG. 5 shows a cross section of the piston 40 wherein channel 19a and hole 52 intersect. Pin 54 occupies the hole, while Fabry-Perot fiber optic sensor subassembly 53 occupies channel 19a. Gap G separates assembly 53 and pin 54. Notably, because pin 54 moves in conjunction with piston 40 while sensor subassembly 53 is anchored to transducer housing 33 (not shown), gap G will change relative to the differential pressure in areas 45a, 45b. As described below, subassembly 53 allows for quantitative measurements of the length (and corresponding changes) of gap G, thereby permitting direct observation, monitoring and measurement of the differential pressure.

Figure 4:
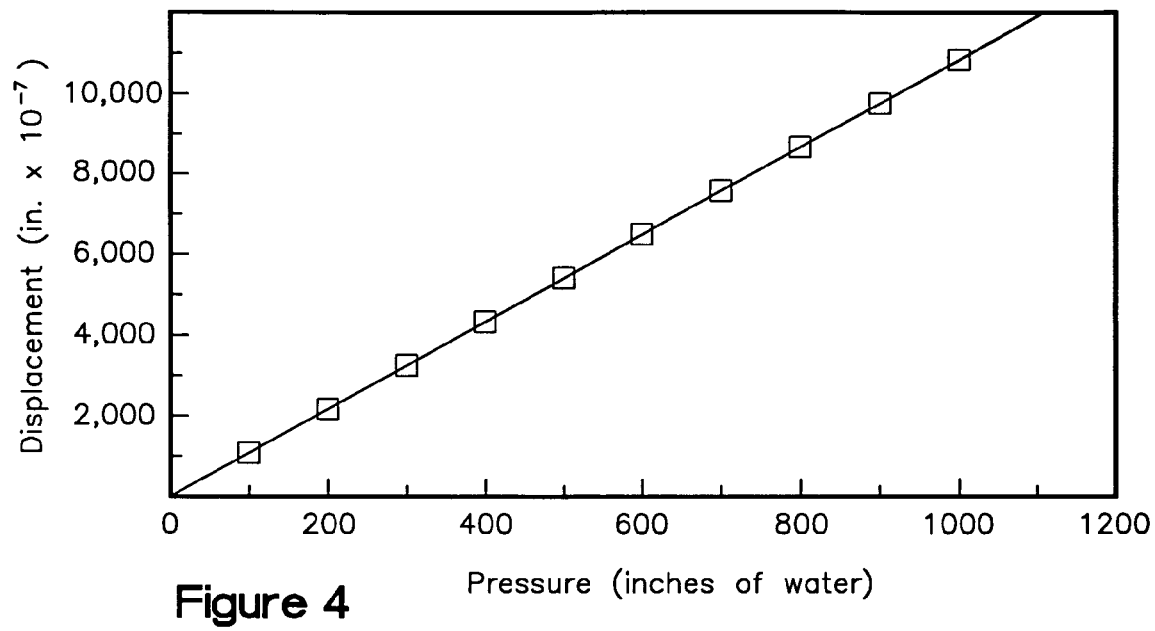
FIG. 4 is a graph plotting diaphragm displacement versus pressure for the present invention.
Figure 6:
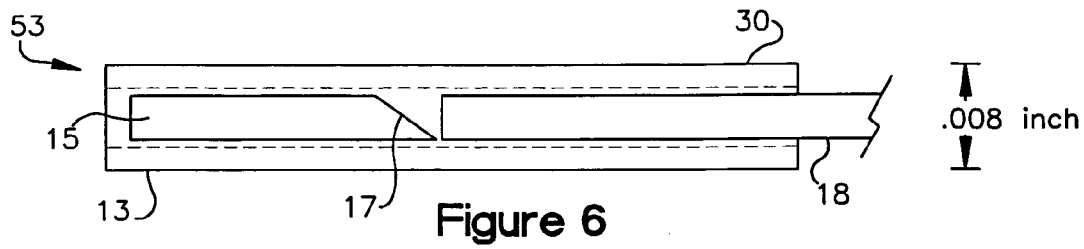
FIG. 6 is a schematic view illustrating a Fabry-Perot displacement sensor subassembly according to the present invention.

FIG. 6 shows the Fabry-Perot fiber optic sensor subassembly 53 used to measure piston motion, and thus diaphragm deflection, via the relationship shown in FIG. 4. The sensor subassembly 53 consists of a tube 13 with coating 30 on one outside surface. Coating 30 is a transparent, partially reflective coating with 30% reflectance on one outside surface of tube 13. A rod 15, preferably with a square or partially flattened cross section so as to prevent rotation or misalignment of the subassembly 53 when installed in the piston 40 while simplifying the transmissive properties required by the invention, is located inside of a corresponding tube 13. Rod 15 has a 45 degree end face 17 with a high reflectance coating, such as gold or like materials, provided thereon. Also located inside square tube 13 is multimode optical fiber 18, which delivers light to the sensor subassembly 53. The sensor subassembly 53 is located in the channel 19 such that the 30% reflectance coating 30 is opposite and parallel to the reflective surface of pin 54 shown in FIG. 5. The reflective coating 30 and reflective surface 32 define a Fabry-Perot gap G. The thickness of gap G changes with deflection of diaphragms 44 and consequently with the displacement of piston 40 to which pin 54 is attached. Light injected from optical fiber 18 is reflected through a 90 degree angle from high reflectance coating 17 so that the beam is normal to reflecting surfaces. The light is partially reflected from the parallel reflecting surfaces.

Figure 7A:
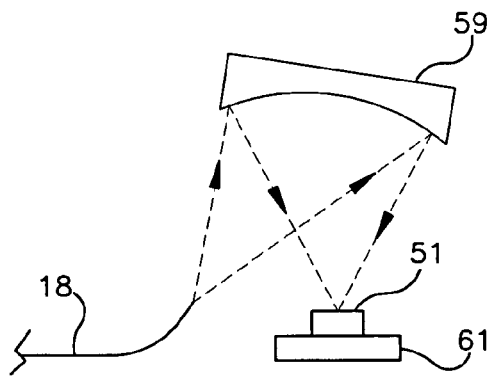
FIG. 7 is a schematic view of the sensing system with light signal processor used in conjunction with the present invention.
Figure 7B:
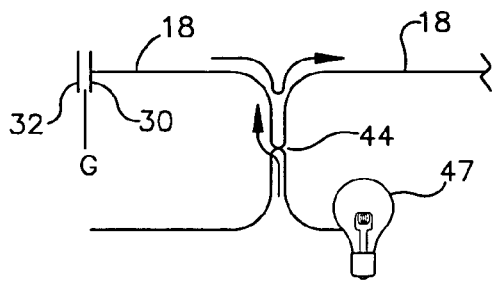
Figure 7C:
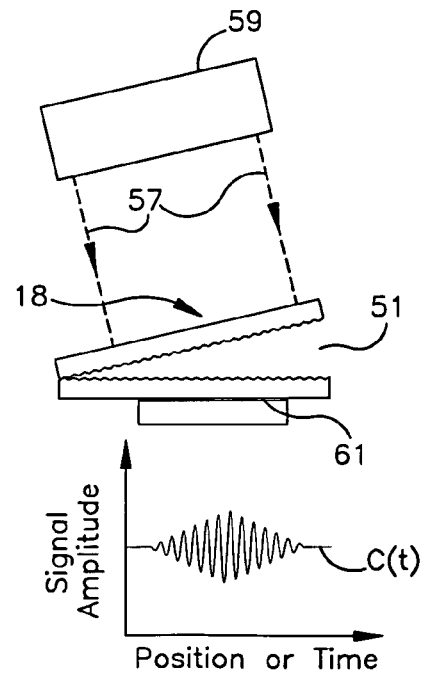

FIGS. 7a–7c are schematic views of the entire sensing system with a light signal processor used in conjunction with the sensor subassembly shown in FIG. 6. A similar embodiment is described in U.S. Pat. No. 5,202,939. The present invention uses those features as well as other features herein described. Referring to FIGS. 7a–7c, the Fabry-Perot gap G is shown schematically along with reflective surfaces and optical fiber 18, which delivers light to the sensor subassembly 53 from source 47 through an optical coupler 49. Light reflected from the gap G reenters fiber 18, returns to coupler 49 and is delivered to cylindrical mirror 59. A cylindrical mirror 59 or a cylindrical lens may be used, although the mirror is the preferred embodiment because the signal processor is more compact with the mirror. However, it is more difficult to explain the system operation with a mirror, which is why two schematic views of the mirror are drawn in FIGS. 7a and 7c. Components 18, 26, 30, 32, 47 and 49 are generic to both views and are only drawn once.

Referring to FIG. 7b, the optical sensing system for measuring displacement or gap thickness is connected to a light source 47 through optical fiber 18 and coupler 49. Light source 47 provides a multiple frequency light signal having predetermined spectral characteristics. The sensing system comprises the Fabry-Perot gap G from which light is reflected back into optical fiber 18, a cylindrical mirror 59 for collecting and focusing at least a portion of the light signal reflected from the Fabry-Perot gap G and a Fizeau wedge 51 through which the focused light signal is passed. The Fabry-Perot gap G includes two reflectors 30, 32 substantially parallel to one another and spaced by a given distance that reflects light with spectral properties that are affected by changes in the gap thickness. The Fabry-Perot gap G is provided with a multimode optical fiber 18 coupled to both the light source and cylindrical mirror 59 through optical coupler 49. Light reflected from the Fabry-Perot gap G thus passes through the Fizeau wedge 51. Exiting wedge 51 is a spatially spread light signal indicative of the spectral characteristics of the light reflected from the Fabry-Perot gap G. Thereby, the thickness of gap G can be determined by measurement and analysis of the spectrum of the spatially spread light signal as described in detail in U.S. Pat. No. 5,202,939, incorporated by reference herein.

In operation, the luminous flux emitted by light source 47 (for example a tungsten filament lamp) is launched into optical fiber 18 and the light is guided to coupler 49, which routes approximately 50% of the light to the Fabry-Perot gap. A portion of the light is reflected from the Fabry-Perot gap. By measuring the reflected light spectrum equal to 1−X(80), the thickness, t of the Fabry-Perot gap can be calculated by cross-correlating the measured spectrum X(λ) the theoretical transmittance function given by $$T(\lambda,t)=(1+F\sin^2[2\pi nt/\lambda])^{-1} \quad (1)$$

where t is the spacing between mirrors 30 and 32 n is the refractive index of material between mirrors 30 and 32 (e.g. for air n=1) λ is the wavelength of the light signal $F=4R/(1-R,^2$ where R is the reflectance of the mirrors 30 and 32

The cross-correlation function C(t) is then calculated as a function of the gap thickness, t with the following relation:

$$C(t) = M^{-1} \sum_{n=0}^{M-1} X(\lambda_o + n\Delta\lambda)(1 + F\sin^2[2\pi nt/(\lambda_o + n\Delta\lambda)])^{-1} \quad (2)$$

where the effective gap thickness t is given by a maximal cross-correlation coefficient $C(t)_{max}$.

In general, measurement of the reflected light spectrum requires a relatively complex apparatus and calculation of the cross-correlation function is very time consuming. To simplify these requirements an instantaneous method is used to obtain C(t) with an optical cross-correlator, which is the Fizeau wedge 51. The Fizeau wedge 51 consists of two surfaces that intersect at an angle of approximately 1.2 arc minutes. Both surfaces have a reflectance of approximately 30% and transmittance of approximately 70%.

The reflecting surfaces of the Fizeau wedge 51 may be produced using methods known in the art. For a representative example of such methods, refer to U.S. Pat. No. 5,202,939, which is incorporated by reference herein.

The Fizeau wedge 51 works as an optical cross-correlator with the cavity length dependent on the position along the wedge. For example, the light intensity reflected from the Fabry-Perot gap having a thickness of $8 \times 10^{-4}$ inch will be maximally transmitted by the Fizeau wedge 51 at an exact position along the wedge 51 where the distance between the reflective surfaces is equal to $8 \times 10^{-4}$ inch. When the thickness of the Fabry-Perot gap G in FIG. 5 changes with diaphragm deflection, the location of maximally transmitted light intensity will shift a corresponding amount to a new position along the Fizeau wedge 51. Therefore, the gap thickness G and the thus the magnitude of diaphragm deflection can be determined directly from a measured shift in the maximally transmitted light intensity $C(t)_{max}$.

The cross-correlation C(t) is instantaneously produced because the entire width of the Fizeau wedge 51 is illuminated by light projected from cylindrical mirror 59, which images a point to a line. The point is the exit end of optical fiber 18 from which the output light signal emanates and the line spans the region of the wedge 51 denoted by the spacing between the dotted lines 57 in the front view portion of FIG. 7. The light signal transmitted through the Fizeau wedge 51 is then detected by a photodetector array 61, which can be a charge-coupled device (CCD) detector array or a photodiode array where both consist of a linear set of discrete light detectors called pixels. Detector array 61 receives the spatially spread light signal (from the Fizeau wedge 51) and generates a set of discrete electrical signals that represent the spectrum of the spatially spread light signal. Thus, the cross-correlation function C(t) is coded onto the pixels of the photodetector array 61 and each pixel corresponds to a unique correlated Fabry-Perot gap thickness t. The gap thickness t may range for example from 0 to 0.05 inch. The thickness of the Fabry-Perot gap G is finally determined by the position of the pixel that measures the maximum light intensity. Notwithstanding this reliance on intensity, it should be appreciated that only the relative maximum intensity be detected, and the invention itself does not necessitate calibrating that intensity to correspond to an diaphragm deflection. Instead, the relative maximum intensity is merely used to identify the appropriate pixel in the CCD which in turn provides for direct quantitative measurement of gap distance G.

Shown in FIG. 7 is a typical signal reading C(t) from the photodetector array 61 after electronic filtering. The pixels, scanned at a rate that can be 1 kHz, exhibit the cross-correlation function C(t) of the Fabry-Perot gap G that is cross-correlated with the Fizeau wedge 51. Software is used to find the pixel where the function C(t) has its maximum value $C(t)_{max}$. Various options discussed in U.S. Pat. No. 5,202,939 can be implemented in software to precisely determine $C(t)_{max}$.

Figure 8:
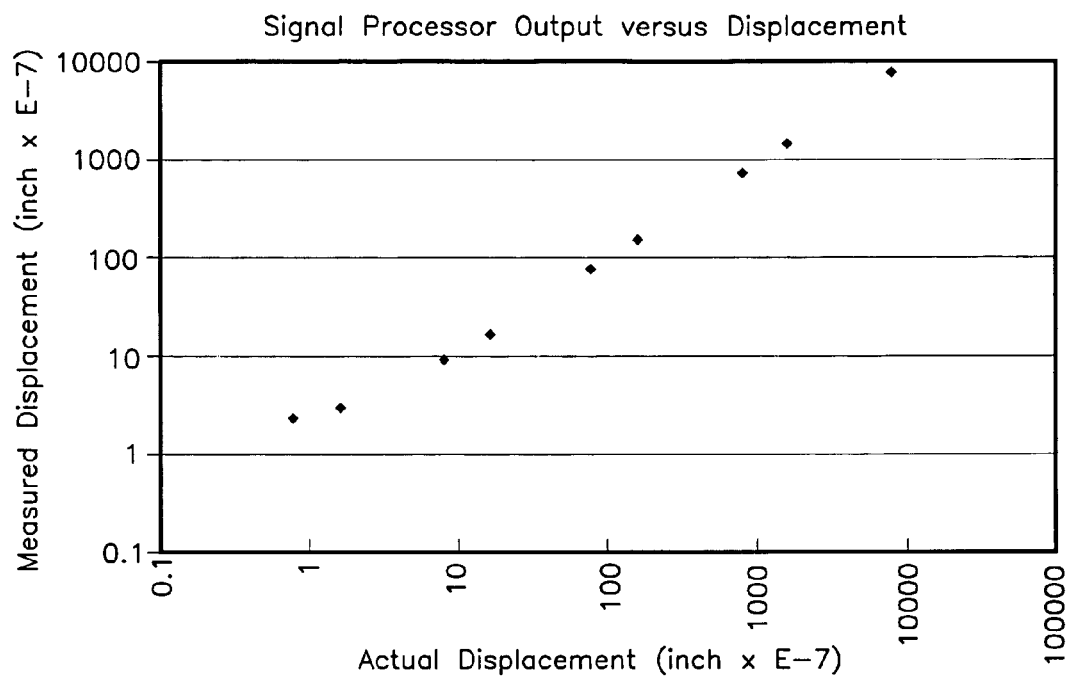
FIG. 8 is a graph plotting signal processor output signal versus displacement for a Fabry-Perot fiber optic sensor according to the present invention.

FIG. 8 is a graph plotting signal processor output signal versus displacement for the sensing system shown in FIG. 7. This result shows that Fabry-Perot gap G and thus diaphragm deflection in the dP transducer can be measured over a range from $8 \times 10^{-8}$ inch to $8 \times 10^{-4}$ inch.

Figure 9:
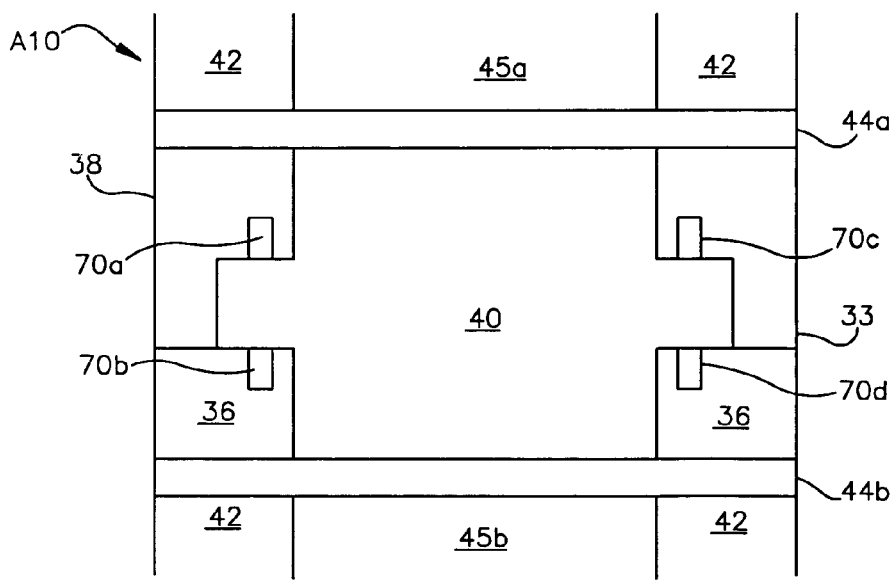
FIG. 9 is a cross sectional view of an alternative embodiment of the invention.

An alternate embodiment A10 is shown in the drawing in FIG. 9. Two circular diaphragms 44a, 44b are separated by cylindrical piston 40, and the remaining components (including transducer housing 33, flanges 42 and welds 34, 60) are similar to those described above.

Notably, four fiber sensor assemblies (FSA) 70a, 70b, 70c, 70d face the piston within the confines of the stop 48. By positioning the sensors on the outside of the piston instead of internal to the piston, it is possible to simplify the assembly and set the starting gap of the Fabry-Perot sensors. Each FSA consists of an optical fiber held inside a ferrule. The end of the fiber is coated with a partial reflector (two-way mirror) with approx. 30% reflectance. The sides of the piston that face the FSAs are polished flat and parallel. The ends of the fibers and reflective sides of the piston define four separate Fabry-Perot interferometer gaps G1, G2, G3, G4 as shown in FIG. A1. Gaps G1 and G3 increase and G2 and G4 decrease if P1>P2 and gaps G1 and G3 decrease and G2 and G4 increase if P1<P2.

The fiber in each FSA is routed to a signal processor (shown in FIG. 7) where the magnitude of the Fabry-Perot interferometer gap is determined as described above. For each sensor, the gaps Gx are converted to electronic signals Sx. Each fiber may be connected to a separate, dedicated signal processor or all four fibers may be multiplexed to one signal processor. The use of four separate sensors rather than one enables implementation of one or more signal processing algorithms for error reduction and improved resolution of small diaphragm displacements. For example, it may be desirable to define two output signals $$O1 = (S1-S2)/(S1+S2) \quad (A1)$$

$$O2 = (S3-S4)/(S3+S4) \quad (A2)$$

O1 and O2 should be equal if the diaphragms and piston are coplanar, the displacements caused by differential pressure are uniform, and there is no mechanical interference. If there are nonuniformities, the output signal could consist of the average value of O1 and O2. Or it may be desirable to define the output signal as $$O3 = S1 + S3 \quad (A3)$$

which is a signal with twice the magnitude of S1 or S3 separately. Or we can define the output signal:

$$O4 = |S1+S3|-|S2-S4| \quad (A4)$$

which is a signal equivalent to O3 but with a first order correction for electronic noise, since noise voltage is always additive irrespective of whether two signals are added or subtracted. Other signal processing methods are possible as known in the art.

Using the arrangement of FIG. 9, the need for providing hole 52 and channels 19a, 19b is obviated, thereby simplifying the manufacture and design. Most notably, the difficulties in aligning the sensor assembly 53 with the pin 54 are avoided, and the piston 40 may comprise a solid object with an annular protrusion.

In yet another embodiment, the piston 40 may be fashioned so that the annular protrusion comprises an enlarged disc or plate at one or both ends of the piston (i.e., the end of the piston that abuts and is affixed to the pressure boundary diaphragm) and/or extending part or all of the peripheral edges of the piston. The disc/plate(s) would fit into the inner-peripheral groove of the transducer housing so as to provide the stop means. In particular, instead of the cross shape described above, the piston may have an I shape, a T shape, an L shape or other axially and/or planarly asymmetrical shapes (e.g., C shape, U shape, etc.). Note all of the aforementioned shapes are with respect to a cross-sectional or top view of the piston, so long as the peripheral protrusion is provided on the piston in a manner which permits the protrusion to communicate with a corresponding inner-periphery groove in at least a portion of the transducer housing (of course, certain cross sectional shapes such as a cross shape or a T shape already integrate the protrusion as part of the stated shape itself). Either FSAs or the hole and channel arrangement could be used to implement the Fabry-Perot sensor in any of these arrangements.

Finally, it should be noted that the small size, ruggedness and the capability of the present invention to withstand high temperature environments allows for integration of a transducer directly inside of an orifice plate or venturi tube. A side view of such integration is shown in FIGS. 10a and 10b.

Figure 10A:
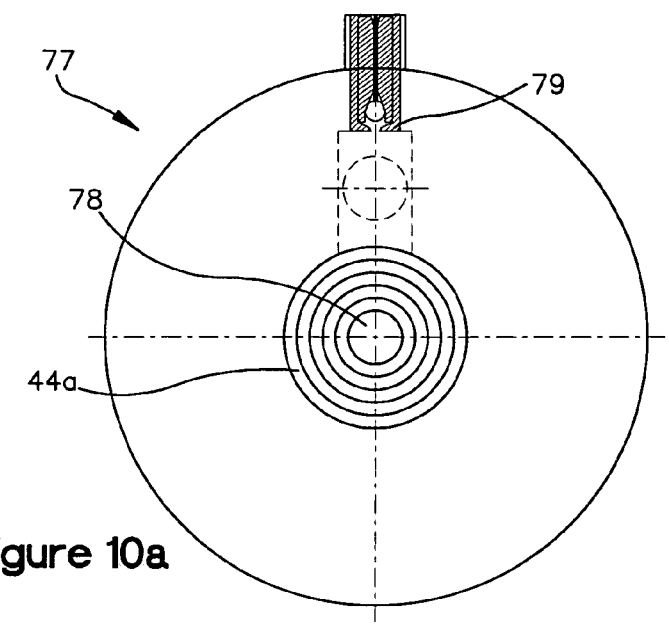
FIG. 10a is a top-view of an orifice plate including the integrated transducer design contemplated by the present invention.
Figure 10B:
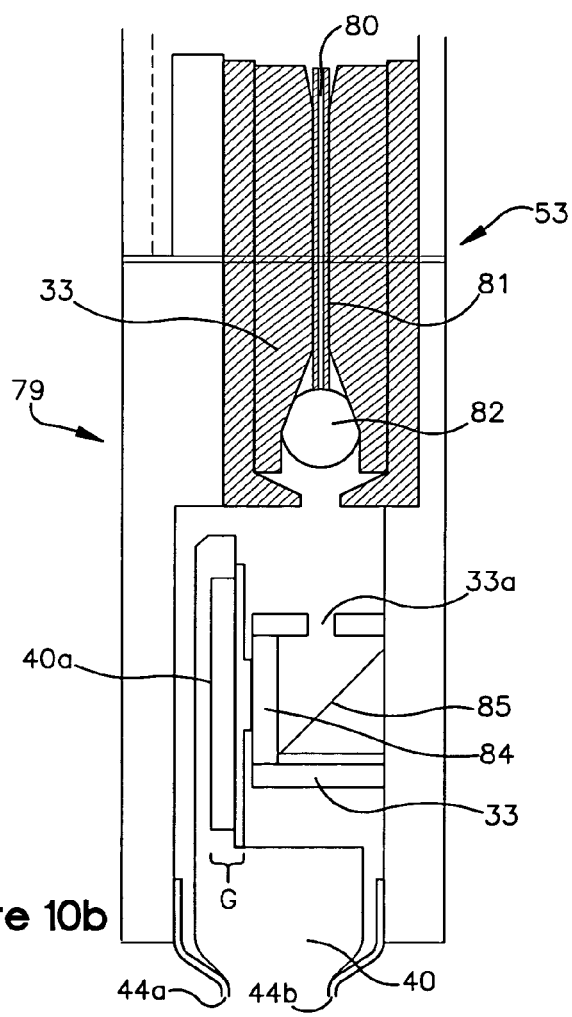
FIG. 10b is a cross sectional view of the integrated transducer.

In FIG. 10a, a top-view of an orifice plate 77 includes flow orifice 78 and integrated transducer 79. As better seen in FIG. 10b, light provided to the integrated transducer 79 enters the sensor assembly 53 through an optical fiber 80, which may be fixed in position inside a glass alignment ferrule 81. An optional 1.5 mm diameter ball lens 82 collimates light that exits the fiber so that the collimated light passes through a hole 33a (or other transparent portion) of the transducer housing 33. Mirror 85 reflects the light through a glass plate 84 and across the Fabry-Perot sensor gap G, which is defined by a partially reflective two-way mirror coating on the glass plate 84 and a highly reflective coating 40a (e.g., gold) attached to the annular protrusion on the piston 40. The reflected light from the plate 84 and the coating 40a retraces the same optical path, reenters the fiber 80 and returns to a signal processor which forms part of the Fabry-Perot sensor previously described.

When the differential pressure changes, the piston and protrusion move and the Fabry-Perot gap G changes. Such changes modulate the reflected light, which is demodulated in the signal processor according to the methods described above.

Notably, the housing is sized to provide for stops as described above, although it should be appreciated that the piston 40 also contacts the diaphragm 44a or 44b in addition to the housing 33 connected thereto (which is, itself, integrated as part of orifice plate 77). In the same manner, one will appreciate that a portion of the housing 33 is still situated between, but beyond the outer periphery of, the diaphragms 44a, 44b. Also, while FIGS. 10a and 10b only illustrates a single subassembly 53, it should be understood that multiple subassemblies could be provided throughout the orifice plate 77, provided corresponding changes were made to the size and shape of the piston 40, diaphragms 44a, 44b and other corresponding elements. Similarly, separate diaphragms, pistons, etc. could be provided without departing from the principles of this invention.

Note that the claims appended hereto are intended to cover the embodiments described above, as well as all equivalent structures and methods associated therewith.

We claim:

1. A differential pressure transducer comprising:
   first and second diaphragms, said first and second diaphragms each having an outer edge;
   a transducer housing having a peripheral groove, at least a portion of said housing situated between the outer edge of the first and second diaphragms;
   a piston having a protrusion which fits within the peripheral groove, said piston affixed to the first and second diaphragms, enclosed by the transducer housing and movable relative to the transducer housing; and
   at least one Fabry-Perot sensor affixed to the transducer housing, said Fabry-Perot sensor including means for quantitatively measuring movement of the piston.

2. The apparatus according to claim 1, wherein the piston includes a reflective surface defining one end of a Fabry Perot gap.

3. The apparatus according to claim 1, wherein the piston moves along a parallel axis relative to the transducer housing.

4. The apparatus according to claim 1, wherein the Fabry-Perot sensor extends through a void created within the piston.

5. The apparatus according to claim 1, wherein the Fabry-Perot sensor is affixed to the transducer housing proximate to the peripheral groove.

6. The apparatus according to claim 1, wherein the annular protrusion defines one end of the piston.

7. The apparatus according to claim 1, wherein the transducer housing comprises first and second support rings, said first support ring having a varying diameter which defines a portion the peripheral groove.

8. The apparatus according to claim 1, wherein the transducer housing is integrated within one of an orifice plate or a venturi tube.

9. The apparatus according to claim 1, wherein the piston is formed in one of: a T-shape, an I-shape, an L-shape, a C-shape, a U-shape, a cross shape, an axially asymmetrical shape or a planarly asymmetrical shape.

10. A method for measuring differential pressure changes between two diaphragms, the method comprising:
    positioning a piston having a protrusion between two diaphragms and enclosing the piston within a transducer housing containing a Fabry-Perot sensor so that the annular protrusion fits with a peripheral groove on the transducer housing;
    monitoring the Fabry-Perot sensor to quantitatively determine movement of the piston relative to the transducer housing; and
    calculating differential pressure variations between the two diaphragms based upon the quantitatively determined movement.

* * * * *

UNITED STATES PATENT AND TRADEMARK OFFICE
CERTIFICATE OF CORRECTION

| | | |
|---|---|---|
| PATENT NO. | : 7,134,346 B2 | Page 1 of 1 |
| APPLICATION NO. | : 11/105670 | |
| DATED | : November 14, 2006 | |
| INVENTOR(S) | : Richard L. Lopushansky and John W. Berthold | |

It is certified that error appears in the above-identified patent and that said Letters Patent is hereby corrected as shown below:

In the abstract:

Line 7, insert --sensor-- between "the" and "in"

In the specification:

Column 8, line 52, delete "1-X(80)" and insert --1 -X(n)--

Column 8, line 53, insert --with-- after "X(n)"

Column 8, line 63, delete "F=4R/(1-R2" and insert --F=4R/(1-R)2--

Signed and Sealed this

Third Day of April, 2007

JON W. DUDAS
*Director of the United States Patent and Trademark Office*